United States Patent Office 3,391,134
Patented July 2, 1968

3,391,134
ANTHRAQUINONE AND ANTHRAQUINONE-AZO DYESTUFFS
Rudolf Kühne and Fritz Meininger, Frankfurt am Main, and Heinrich Frölich, Kelkheim, Taunus, Germany, assignors to Farbwerke Hoechst Aktiengesellschaft vormals Meister Lucius & Bruning, Frankfurt am Main, Germany, a corporation of Germany
No Drawing. Filed June 9, 1964, Ser. No. 373,862
Claims priority, application Germany, June 10, 1963, F 39,951
6 Claims. (Cl. 260—207.1)

ABSTRACT OF THE DISCLOSURE

Anthraquinone dyestuffs having, as characteristic side grouping, a moiety of the formula

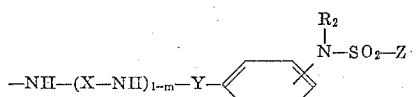

wherein X is

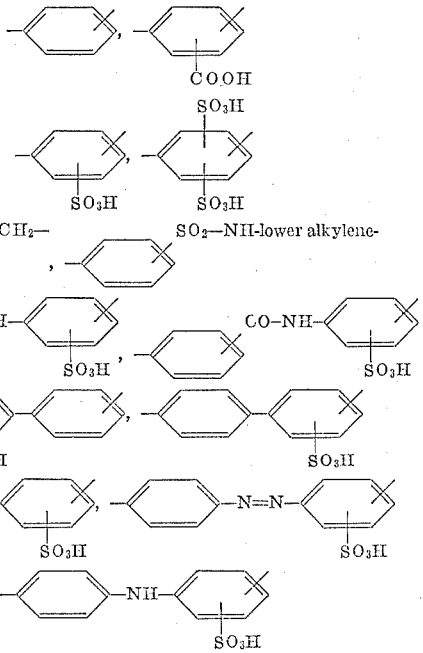

or

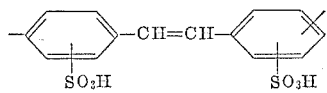

Y is sulfonyl or carbonyl, $R_2$ is hydrogen or lower alkyl, Z is —CH=CH$_2$ or —CH$_2$—CH$_2$—Cl, and $m$ is 0 or 1.

The present invention relates to new valuable reactive dyestuffs and to a process for preparing them; more particularly, it relates to reactive dyestuffs of the general Formula 1

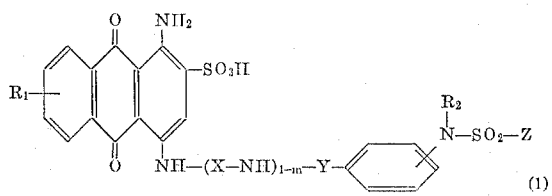

in which $R_1$ represents a hydrogen atom or the sulfonic acid group, X represents a bivalent radical of the benzene, benzyl, diphenyl, diphenylamine, stilbene, azobenzene, N-ethylbenzenesulfonamide, benzenesulfanilide or benzenecarboxylic acid anilide series, Y represents a sulfonyl or carbonyl group, $R_2$ represents a hydrogen atom or an alkyl radical, preferably an alkyl radical having 1 to 4 carbon atoms, and $m$ represents the number 0 or 1.

The dyestuffs of the above Formula 1 can be prepared by reacting 1 mol of an acylable dyestuff of the Formula 2

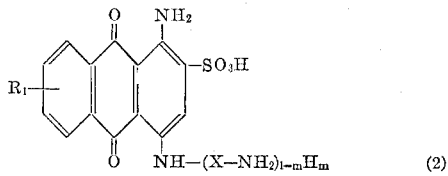

in which $R_1$, X and $m$ are defined as above, with about 0 to 2 mols of a compound of the Formula 3

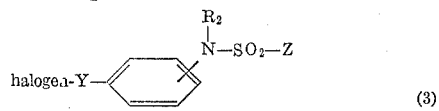

in which Y, $R_2$ and Z are defined as above.

The reaction of the water-soluble starting dyestuffs with the compounds of the Formula 3 is preferably carried out in water. The acid halides may be used either in concentrated form, if desired or required with preceding, simultaneous or subsequent addition of a substance having emulsifying action or a surfactant for a better distribution in the aqueous phase, or dissolved in an organic solvent. Solvents which are suitable for this purpose are, for example, acetone, chloroform, benzene, toluene or chlorobenzene.

The reaction temperature is determined by the reactivity of the starting substances. Generally, the starting dyestuffs can be reacted with sufficient speed at a temperature in the range from 0° to 50° C., preferably from 0° to 5° C., with the condensing agents. Reaction temperatures below 0° C. and above 50° C. can principally also be used, but then the reaction times are correspondingly longer or the yields smaller.

The reaction is carried out in a weakly acid, neutral or weakly alkaline medium at pH-values ranging from about 3 to 9.

The hydrohalic acid that is formed when using the mentioned acid halides is neutralized by the presence or by gradual addition of agents binding mineral acid, for example, sodium acetate, sodium formate, sodium or potassium carbonate or sodium or potassium bicarbonate, which are used either in solid form or in the form of aqueous solutions.

When the condensation reaction is complete, the water-soluble dyestuffs are precipitated, if desired after previous neutralization, from the solutions or suspensions, filtered, washed and dried.

The dyestuffs obtainable by the process of the present invention may also be prepared by reacting the starting dyestuffs with the acid halides of the Formula 3 in an inert organic solvent. If desired or necessary, these reactions are carried out in the presence of or while adding acid-binding agents. Solvents which are suitable for this purpose are, for example, benzene, toluene, chlorobenzene, nitrobenzene, tetrahydrofurane, acetone, dimethylformamide or dimethylacetamide. The acid halides of the Formula 3, used in accordance with the present invention for preparing the dyestuffs, constitute novel compounds.

The acid halides of the Formula 3 can be prepared for example, (a) By reacting aminobenzenecarboxylic acids or -sulfonic acids with acylating agents which introduce the radical of the vinylsulfonic acid, for example, with carbyl sulfate or vinylsulfonic acid chloride, or (b) By allowing, for example, acetic acid anhydride, methanesulfonic acid chloride or p-toluenesulfonic acid chloride to act on isethionylaminobenzenecarboxylic acids or -sufonic acids, whereby the hydroxyl group in β-position is esterified.

The benzenecarboxylic acid- or benzenesulfonic acid derivatives obtained by the methods described under (a) and (b) may be alkylated, if desired, at the nitrogen atom bound to an aromatic nucleus, with an alkylating agent such as dimethyl sulfate or diethyl sulfate and then converted in known manner into the corresponding carboxylic acid or sulfonic acid halides.

The sulfonic acid chlorides of the Formula 3 may also be prepared from aniline derivatives of the formula

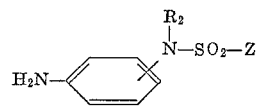

in which $R_2$ and Z are defined as above, by diazotizing these compounds and subsequently reacting the diazonium salts thus obtained with sulfur dioxide in the presence of acetic acid and copper chloride according to a process described by H. Meerwein (B. 90, 841, 1957).

As examples of such starting compounds, which are prepared in the manner described above and may be used in accordance with the process of the present invention, there may be mentioned the following compounds: 2 - (N - methyl - β - chloroethylsulfonylamino)-benzene-1-carboxylic acid chloride, 2 - (β - chloroethylsulfonylamino) - benzene - 1 - carboxylic acid chloride, 4 - (N - methyl - β - chloroethylsulfonylamino) - benzene - 1 - carboxylic acid chloride, 3 - (N - methyl - β-chloroethylsulfonylamino) - benzene - 1 - carboxylic acid chloride, 2 - (N - ethyl - β - chloroethylsulfonylamino) - benzene - 1 - carboxylic acid chloride, 4 - (N-butyl - β - chloroethylsulfonylamino) - benzene - 1 - carboxylic acid chloride, 4 - (N - methylvinylsulfonylamino) - benzene - 1 - carboxylic acid chloride or -sulfonic acid chloride, 3 - (N - methyl - vinylsulfonylamino) - benzene - 1 - sulfonic acid chloride, 4 - (N-methyl - β - chloroethylsulfonylamino) - 3 - chlorobenzene - 1 - carboxylic acid chloride, 4 - β - chloroethylsulfonylamino - benzene - 1 - carboxylic acid chloride or 4 - (N - methyl - β - bromoethylsulfonylamino) - benzene - 1 - carboxylic acid bromide.

The dyestuffs obtained by the process of the present invention are suitable for the dyeing or printing of various natural, regenerated or synthetic fibrous materials such as cotton, viscose, regenerated cellulose, wool, silk, leather, polyamides, polyacrylonitrile, cellulose acetate or aromatic polyester fibers, depending on the nature of the dyestuffs. For these purposes, the dyestuffs of the invention may be used according to the dyeing and printing methods conventionally used in the industry, as illustrated hereinafter.

The use of the dyestuffs obtainable by the process of the present invention depends in the first instance on the fibrous material to be dyed and on the constitution of the dyestuff to be employed, in particular on the number and nature of the groups present which impart solubility in water. For example, those of the novel dyestuffs which preferably contain more than one group imparting solubility in water, for example, two or more sulfonic acid and/or carboxylic acid groups in the molecule, are especially suitable for the dyeing of cellulose-containing materials, particularly of cotton.

The fixation of the novel dyestuffs on the cellulose-containing fibrous materials dyed according to the usual dyeing or printing methods is carried out by a treatment with an acid-binding agent, for example, sodium or potassium hydroxide, sodium or potassium carbonate, sodium or potassium bicarbonate, sodium silicate, sodium triphosphate or sodium trichloroacetate and, if desired, by the action of heat. The treatment with the acid-binding agent can be carried out prior to, during or after the application of the dyestuff.

Thus, for example, cellulose-containing textile materials can be dyed according to the so-called direct dyeing method, by treating the textile materials with an aqueous solution of the dyestuff in the presence of acid-binding agents at a temperature in the range of, for example, 40° and 100° C.

For preparing dyeings, one may also apply the dyestuff to the cellulose-containing textile material according to the usual dyeing and padding methods and then introduce the goods dyed into an aqueous solution of the acid-binding agent at a temperature in the range of 20° and 100° C.

Furthermore, the novel dyestuffs may be applied, for example, by padding or from a dyebath at a temperature ranging from 20° to 100° C. to the textile material impregnated with an aqueous solution of the acid-binding agent, and heating, if desired, after intermediate drying.

Furthermore, the textile material may be treated with an aqueous solution of the dyestuff in the presence of the acid-binding agent, squeezed and then allowed to remain at room temperature or heated for a short period, for example, by steaming, if desired, after an intermediate drying.

The aqueous dyestuff solutions used for preparing the dyeings may be combined with other substances; thus, there may be added above all electrolytes such as sodium chloride or sodium sulfate, urea, dispersing agents, surfactants and thickeners, for example, sodium alginate.

The novel dyestuffs are also suitable for the preparation of prints on cellulose materials. For this purpose, the fabric is printed with a printing paste containing the acid-binding agent and subjected to a short heat treatment, if desired, after intermediate drying. It is also possible to apply a printing paste containing one or several of the dyestuffs obtainable by the process of the invention to the cellulose fabric impregnated with an acid-binding agent, and subsequently to heat the printed fabric, for example, by steaming. Furthermore, the cellulose materials may first be printed with a printing paste containing one or several dyestuffs, and then treated with the aqueous solution of acid-binding agents, preferably in the presence of electrolytes such as sodium chloride or sodium sulfate at a temperature in the range from about 60° to 100° C. The printing pastes used for preparing the prints may also contain further substances, for example, urea, thickeners, water-in-oil emulsions, surfactants and m-nitrobenzenesulfonic sodium. The dyeing and prints on cellulose prepared with the novel dyestuffs are generally rinsed after the dyeing or printing process with water, then soaped and rinsed again with water before drying.

Finally, the novel dyestuffs may also be used for the dyeing of nitrogen-containing textile materials, for example, wool and polyamide fibers. The dyeing is carried out from weakly alkaline, neutral or acid dyebaths in the presence of compounds conventionally used for the dyeing of nitrogen-containing textile materials, for example, sodium sulfate, ammonium acetate, surfactants such as quaternary ammonium salts, and non-ionic dispersing agents. If desired, the pH-value of the dyebath may be varied during the dyeing process by adding alkalies or alkaline salts or by adding acids or acid salts, for example, in such a manner as to start the dyeing at a pH-value of 4 and increasing the pH-value during the dyeing to 7.5.

The novel dyestuffs give in general full and clear shades which are distinguished by good properties of fastness, especially by good to very good fastness to light and wet processing.

The following examples illustrate the invention, but they are not intended to limit it hereto.

Example 1

71 parts by weight of the trisodium salt of the dyestuff of the following formula

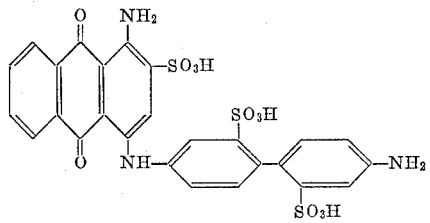

prepared by condensation of 1-amino-4-bromoanthraquinone-2-sulfonic acid with 4,4'-diaminodiphenyl-2,2'-disulfonic acid, are dissolved in 1650 parts by volume of water. Into this solution, there are introduced dropwise, while stirring intensely, at 0° to 5° C., a solution of 32.6 parts by weight of 4-(N-methyl-β-chloroethylsulfonylamino)-benzene-1-carboxylic acid chloride in 100 parts by volume of chloroform and, simultaneously, an aqueous sodium carbonate solution having a strength of 10% by weight, in a manner such that the pH-value is kept at 6 to 7. After 12 hours, the condensation is complete. The chloroform is then distilled off. The dyestuff formed is salted out with potassium chloride, filtered off and dried. The dyestuff constitutes a blue powder which dissolves in water to give a blue solution.

The dyestuff has the formula

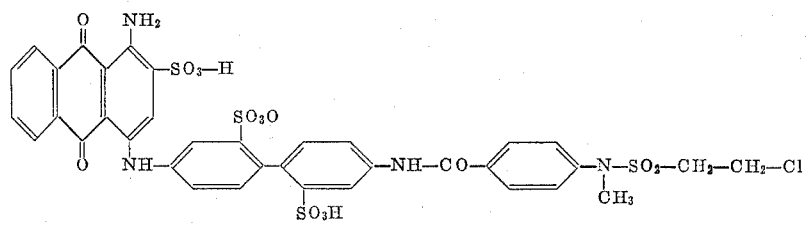

and gives a blue dyeing on cotton which is fast to light, to washing and to boiling.

Similar dyestuffs are obtained when using the parts by weight indicated in the above example of the anthraquinone dyestuffs listed in the following table and reacting them with the respective acylating components listed in the second column.

| Anthraquinone dyestuff | Acylating component | Tint on cotton |
| --- | --- | --- |
| 1-amino-4-(4'-amino-2'-sulfonphenylamino)-anthraquinone-2-sulfonic acid. | 4-(N-methyl-β-chloroethylsulfonylamino)-benzene-1-carboxylic acid chloride. | Blue. |
| 1-amino-4-(4'-aminophenylamino)-anthraquinone-2,6-disulfonic acid. | ___do___ | Do. |
| Mixture of 1-amino-4-(4'-aminophenylamino)-anthraquinone-2,5- and -2,8-disulfonic acid. | ___do___ | Do. |
| 1-amino-4-[4'-(4''-amino-2''-sulfophenyl)-phenylamino]-anthraquinone-2,6-disulfonic acid. | ___do___ | Bluish grey. |

| Anthraquinone dyestuff | Acylating component | Tint on cotton |
| --- | --- | --- |
| Mixture of 1-amino-4-[4'-(4''-aminophenylvinyl)-anilino]-anthraquinone-2,2'',3',5 and 2,2'',3',8-tetrasulfonic acid. | 4-(N-methyl-β-chloroethylsulfophenylamino)-benzene-1-carboxylic acid chloride. | Green. |
| Mixture of 1-amino-4-[4'-(4''-aminophenylazo)-anilino]-anthraquinone-2,2'', 5- and 2,2'', 8-trisulfonic acid. | ___do___ | Olive green. |
| 1-amino-4-[4'-(4-aminophenyl)-phenylamino]-anthraquinone-2,3', 2''-trisulfonic acid. | 4-(N-methylvinylsulfonylamino)-benzene-1-sulfonic acid chloride. | Blue. |
| 1-amino-4-[4'-(4''-aminophenyl)-phenylamino]-anthraquinone-2,3',2,''-trisulfonic acid. | 3-(N-methylvinylsulfonylamino)-benzene-1-isocyanate. | Do. |

Example 2

60 parts by weight of the tri-sodium salt of the dyestuff of the formula

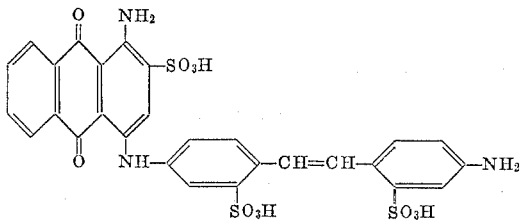

prepared by condensation of 1-amino-4-bromoanthraquinone-2-sulfonic acid with 4,4'-diamino stilbene-2,2'-disulfonic acid, are dissolved at 30° C. in 2150 parts by volume of water. Into the dyestuff solution obtained, there are introduced by strewing in, while stirring vigorously in the course of 2 hours, 50 parts by weight of 4-(N-methyl-β-chloroethylsulfonylamino)-benzene-1-carboxylic acid in the form of a finely ground powder. Simultaneously, a saturated sodium bicarbonate solution is added dropwise so that the pH-value is kept at 5 to 5.5. As soon as the condensation is complete, the precipitated product is filtered off and washed with a sodium chloride solution having a strength of 5% by weight. The filter residue is dissolved in 2500 parts by volume of water at 95° C.; 3 parts by weight of kieselguhr and 2 parts by weight of animal charcoal are added to this solution. The mixture is stirred for one quarter hour at 95° C. and filtered. After the filtrate has cooled, the product is precipitated by means of sodium chloride, filtered off and dried under reduced pressure at 50° to 60° C. The dyestuff obtained which in the form of the free acid has the formula

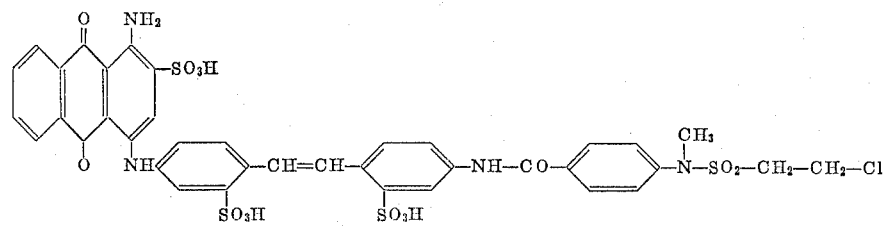

constitutes an olive green powder which dissolves in water to give a green solution.

In the presence of an acid-binding agent, for example, sodium carbonate or sodium hydroxide, the dyestuff gives green dyeings on cotton which are fast to light and to washing.

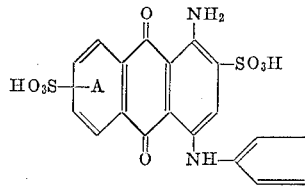

Example 3

17.1 parts by weight of the tri-sodium salt of the dyestuff of the formula

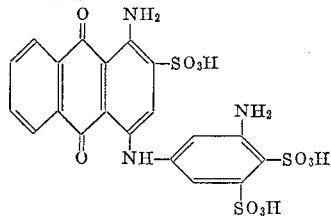

are introduced, with stirring, into 150 parts by weight of N-methyl-pyrrolidone. 18.5 parts by weight of 3-(N-methyl - vinylsulfonylamino) - benzene - 1 - carboxylic acid chloride are added portionwise at 30° C. to the mixture which is subsequently stirred for 1½ hours at 30° to 40° C. As soon as the reaction is complete, the mixture is allowed to run into 300 parts by volume of saturated sodium chloride solution. The separated product is isolated by filtration and dissolved in 500 parts by volume of water. The dyestuff solution thus obtained is filtered and combined with 20% by weight of sodium chloride (referred to the volume). The precipitate is then filtered off, washed with a dilute sodium chloride solution and dried under reduced pressure at 40° to 50° C.

The dyestuff obtained, which in the form of the free acid has the formula

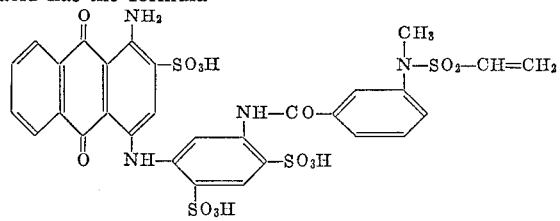

gives, in the presence of sodium bicarbonate, blue prints on cotton that have a good fastness to washing and to light.

Example 4

57.4 parts by weight of the dyestuff of the formula

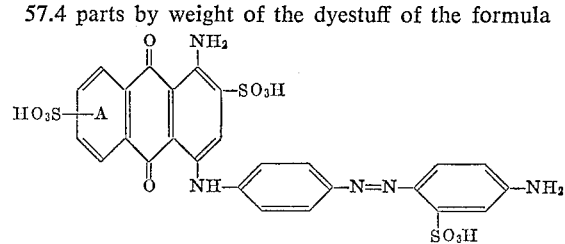

(the sulfonic acid group in the benzene nucleus A is in 5 or 8-position)

in the form of the sodium salt are dissolved in 1775 parts by volume of water. To this solution, there are added dropwise, at 30° to 35° C., 45 parts by weight of 4-(N-methyl - β - chloroethyl - sulfonylamino)-benzene-1-carboxylic acid chloride and, simultaneously, an aqueous sodium carbonate solution in such a manner that the reaction mixture always shows a neutral reaction.

As soon as the condensation is complete, the dyestuff formed is completely salted out by introduction of sodium chloride, filtered off, washed with a dilute sodium chloride solution and dried under reduced pressure. The pure dyestuff which in the form of the free acid has the above formula (the sulfonic acid group in the nucleus A is in 5- or 8- position) dissolves in water to give an olive green solution and dyes cotton, in the presence of sodium triphosphate, olive green tints which are fast to light and to washing.

Example 5

53.3 parts by weight of the di-sodium salt of the dyestuff of the formula

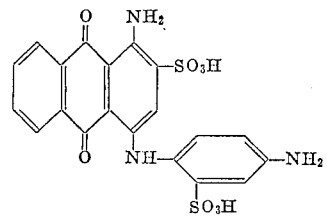

prepared by sulfonation of 1-amino-4-(4'-aminophenylamino) - anthraquinone - 2 - sulfonic acid, are dissolved at 40° C. in 890 parts by volume of water. To this solution, there are added dropwise, at 35° to 40° C., in the course of 1 hour, while stirring vigourously, 50.2 parts by weight of 4 - (N-methyl - β - chloroethylsulfonylamino)-benzene - 1 - sulfonic acid chloride dissolved in 110 parts by volume of acetone and, simultaneously, an aqueous sodium carbonate solution in such a manner that the solution always has a pH-value of 6.5 to 7.0. As soon as the reaction is complete, precipitation of the formed dyestuff having the formula

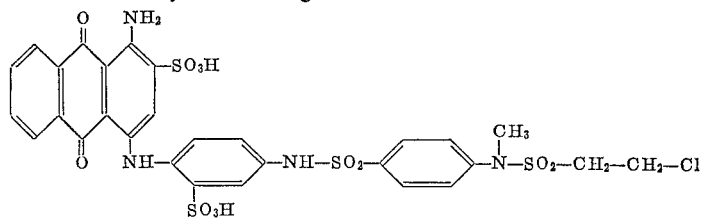

is completed by the addition of sodium chloride, the dyestuff is filtered off, washed with a dilute sodium chloride solution and dried. The dyestuff constitutes a blue powder which dissolves in water to give a blue solution. The new dyestuff gives blue light- and washfast dyeings on cottons when applied from a weakly acid bath.

Example 6

53.3 parts by weight of the di-sodium salt of the dyestuff of the formula

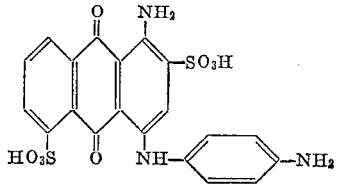

are stirred in the manner described in Example 1, at a pH-value of 7.5 to 9, with 30 parts by weight of 4-(β-chloroethylsulfonylamino)-benzene-1-carboxylic acid chloride. A blue dyestuff powder is obtained which dissolves in water to give a blue solution.

are acylated in the manner indicated in Example 5, at 0° to 10° C., at a pH-value of 3 to 5.5, with 45 parts by weight of 4-(N-methyl-β-chloroethylsulfonylamino)-benzene-1-carboxylic acid chloride and then worked up. The sodium salt obtained of the dyestuff of the formula

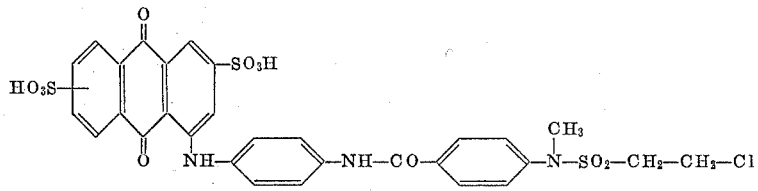

The dyestuff which has the formula

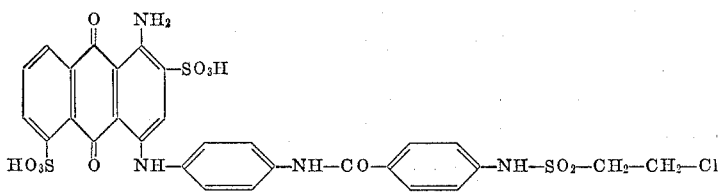

gives, in the presence of sodium carbonate, a blue print on cotton which is very fast to washing and to light.

Example 7

53.3 parts by weight of the di-sodium salt of the dyestuff of the formula

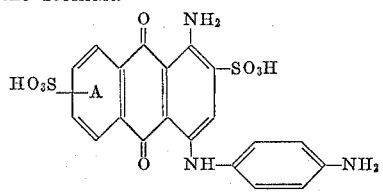

(the sulfonic acid group in the nucleus A is in 5- or 8-position)

constitutes a dark blue powder which dissolves in water to give a blue solution and which dyes cotton fast blue tints, when applied in the presence of sodium carbonate or sodium hydroxide.

When using the above example 46.5 parts by weight of 4 - (N-ethyl-β-chloroethylsulfonylamino)-benzene-1-carboxylic acid chloride or 50.7 parts by weight of 4-(N-butyl-β-chloroethylsulfonylamino) - benzene-1-carboxylic acid chloride instead of 45 parts by weight of 4-(N-methyl-β-chloroethylsulfonylamino)-benzene-1-carboxylic acid chloride, dyestuffs having similar properties are obtained.

Dyestuffs that have similar properties are also obtained when reacting the anthraquinone dyestuffs (I) listed in the following table under corresponding reaction conditions with the respective acid chlorides (II).

| | I<br>Anthraquinone dyestuff | II<br>Acylating component | Tint on cotton |
|---|---|---|---|
| 1 | (structure) | 4-(N-methyl-vinylsulfonylamino)-benzene-1-sulfonic acid chloride. | Blue. |
| 2 | (structure) | 3-(N-methyl-β-chloroethylsulfonylamino)-benzene-1-carboxylic acid chloride. | Do. |

| | I<br>Anthraquinone dyestuff | II<br>Acylating component | Tint on cotton |
|---|---|---|---|
| 3 | 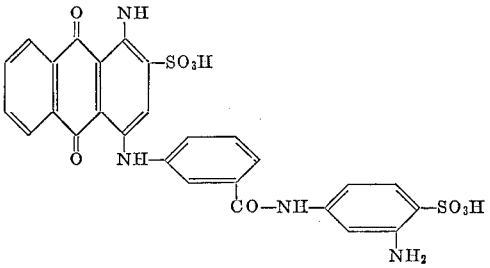 | 3-(N-methyl-β-chloroethylsulfonylamino)-benzene-1-carboxylic acid chloride. | Blue. |
| 4 | 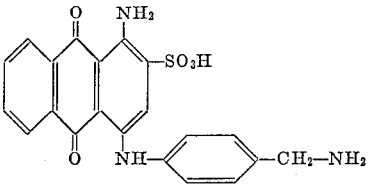 | 4-(N-methyl-β-chloroethylsulfonylamino)-benzene-1-carboxylic acid chloride. | Do. |
| 5 | 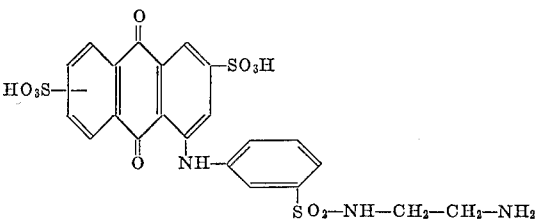<br>(The sulfonic acid group is in 5- or 8-position) | ---do--- | Do. |
| 6 | 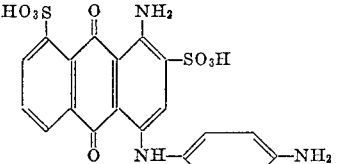 | ---do--- | Do. |
| 7 | 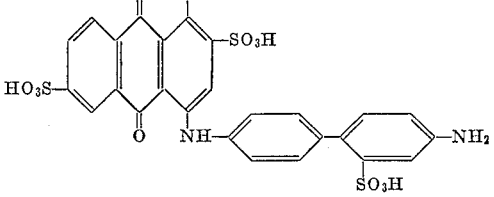 | ---do--- | Do. |
| 8 | 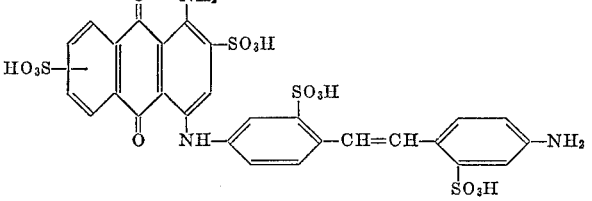<br>(The SO₃H-group is in 5- or 8-position) | ---do--- | Green. |
| 9 | 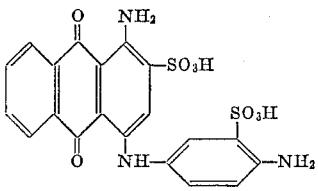 | 4-(N-methyl-vinylsulfonylamino)-benzene-1-carboxylic acid chloride. | Blue. |

| | I<br>Anthraquinone dyestuff | II<br>Acylating component | Tint on cotton |
|---|---|---|---|
| 10 | 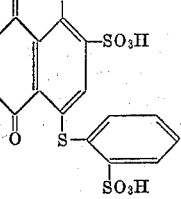 | 4-(N-methyl-vinylsulfonylamino)-benzene-1-carboxylic acid chloride. | Violet. |
| 11 | 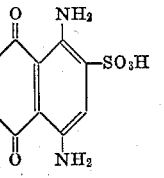 | ......do...... | Do. |
| 12 | 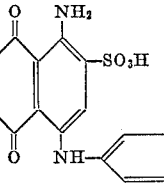 | 4-(N-methyl-β-chloroethylsulfonylamino)-benzene-1-carboxylic acid chloride. | Blue. |
| 13 | 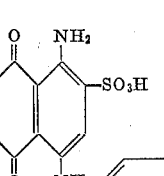 | ......do...... | Blue green. |
| 14 | 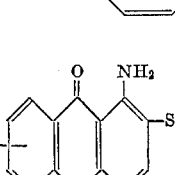<br>(Sulfonic acid group is in 5- or 8-position) | ......do...... | Blue. |
| 15 | 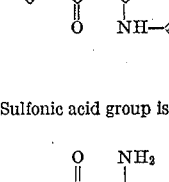<br>(Sulfonic acid group is in 5- or 8-position) | ......do...... | Violet. |

We claim:
1. The dyestuff of the formula

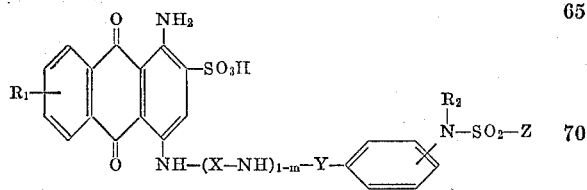

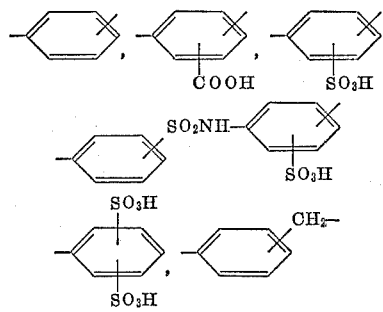

wherein $R_1$ represents a member selected from the group consisting of hydrogen and sulfonic acid group, X represents a member selected from the group consisting of

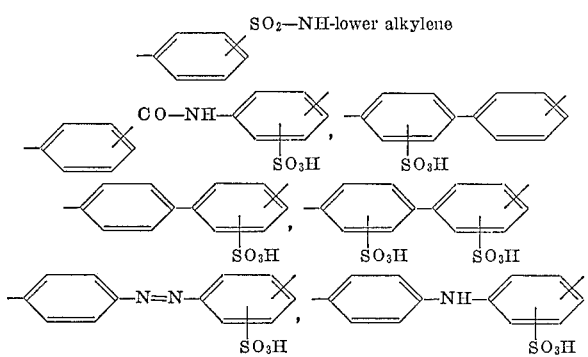

and

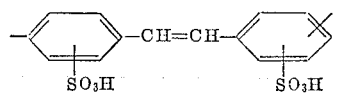

Y represents a member selected from the group consisting of sulfonyl and carbonyl, $R_2$ represents a member selected from the group consisting of hydrogen and lower alkyl, Z represents a member selected from the group consisting of $-CH=CH_2$ and $-CH_2-CH_2-Cl$, and $m$ represents a number from 0 to 1.

2. The dyestuff of the formula

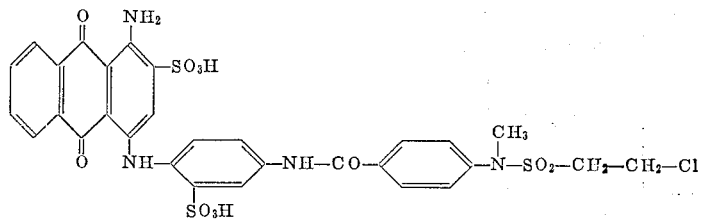

3. The dyestuff of the formula

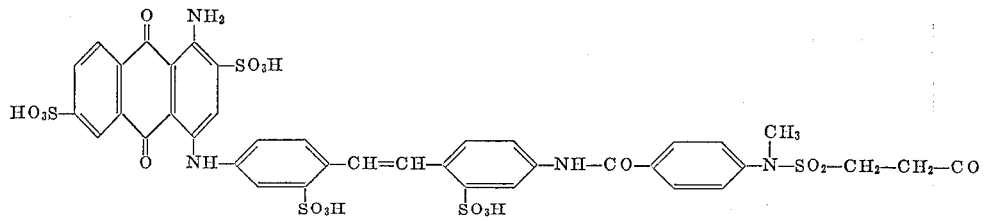

4. The dyestuff of the formula

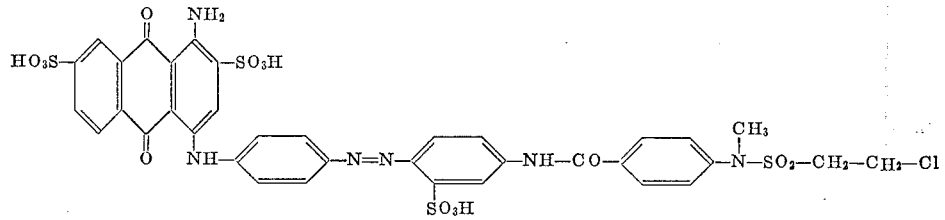

5. The dyestuff of the formula

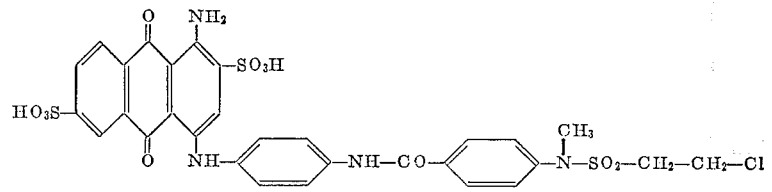

6. The dyestuff of the formula

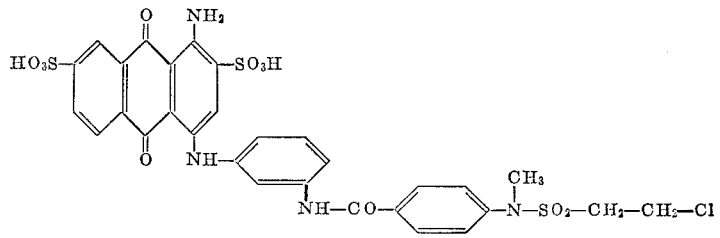

References Cited
UNITED STATES PATENTS
3,154,567   10/1964   Eisele et al. _____ 260—372

CHARLES P. PARKER, *Primary Examiner.*
D. M. PAPUGA, *Assistant Examiner.*